(12) United States Patent
Rabinovitch et al.

(10) Patent No.: US 8,806,137 B2
(45) Date of Patent: Aug. 12, 2014

(54) CACHE REPLACEMENT USING ACTIVE CACHE LINE COUNTERS

(75) Inventors: Alexander Rabinovitch, Kfar Yona (IL); Leonid Dubrovin, Karney Shromron (IL)

(73) Assignee: LSI Corporation, San Jose, CA (US)

( * ) Notice: Subject to any disclaimer, the term of this patent is extended or adjusted under 35 U.S.C. 154(b) by 681 days.

(21) Appl. No.: 13/163,198

(22) Filed: Jun. 17, 2011

(65) Prior Publication Data

US 2012/0324172 A1 Dec. 20, 2012

(51) Int. Cl.
*G06F 12/12* (2006.01)

(52) U.S. Cl.
CPC .................................. *G06F 12/121* (2013.01)
USPC ...... 711/133; 711/136; 711/118; 711/E12.017

(58) Field of Classification Search
CPC ............................. G06F 12/12; G06F 12/0871
See application file for complete search history.

(56) References Cited

U.S. PATENT DOCUMENTS

| | | | |
|---|---|---|---|
| 5,778,427 A * | 7/1998 | Hagersten et al. ............ | 711/128 |
| 6,389,523 B1 * | 5/2002 | Shimazaki et al. ............ | 711/167 |
| 7,493,445 B2 * | 2/2009 | Harada ......................... | 711/118 |
| 2004/0078518 A1 * | 4/2004 | Kuwata ......................... | 711/113 |
| 2010/0088457 A1 * | 4/2010 | Goodrich et al. .................. | 711/3 |

OTHER PUBLICATIONS

Mazen Kharbutli et al., "Counter-Based Cache Replacement and Bypassing Algorithms," IEEE Transactions on Computers, vol. 57, No. 4, Apr. 2008, pp. 1-15.

* cited by examiner

*Primary Examiner* — Charles Rones
*Assistant Examiner* — Tian-Pong Chang
(74) *Attorney, Agent, or Firm* — Otterstedt, Ellenbogen & Kammer, LLP

(57) ABSTRACT

An apparatus for performing data caching comprises at least one cache memory including multiple cache lines arranged into multiple segments, each segment having a subset of the cache lines associated therewith. The apparatus further includes a first plurality of counters, each of the counters being operative to track a number of active cache lines associated with a corresponding one of the segments. At least one controller included in the apparatus is operative to receive information relating to the number of active cache lines associated with a corresponding segment from the first plurality of counters and to implement a cache segment replacement policy for determining which of the segments to replace as a function of at least the information relating to the number of active cache lines associated with a corresponding segment.

21 Claims, 11 Drawing Sheets

FIG. 4

TABLE 1

| | ACCESS ADDRESS | SEGMENT 0 | ACTIVE LINES IN SEGMENT 0 | LRU 0 | SEGMENT 1 | ACTIVE LINES IN SEGMENT 1 | LRU 1 | SEGMENT 2 | ACTIVE LINES IN SEGMENT 2 | LRU 2 |
|---|---|---|---|---|---|---|---|---|---|---|
| 402 | RESET | 0000 | 0 | 0 | 1000 | 0 | 0 | 2000 | 0 | 0 |
| 404 | 0000_0010 | 0000 | 1 | 2 | 1000 | 0 | 0 | 2000 | 0 | 0 |
| 406 | 0000_0110 | 0000 | 2 | 2 | 1000 | 0 | 0 | 2000 | 0 | 0 |
| 408 | 1000_0210 | 0000 | 2 | 1 | 1000 | 1 | 2 | 2000 | 0 | 0 |
| 410 | 2000_0310 | 0000 | 2 | 0 | 1000 | 1 | 1 | 2000 | 1 | 2 |
| 412 | 2000_0210 | 0000 | 2 | 0 | 1000 | 0 | 1 | 2000 | 2 | 2 |
| 414 | 4000_0210 | 4000 | 1 | 2 | 1000 | 0 | 0 | 2000 | 2 | 1 |
| | ... | ... | ... | ... | ... | ... | ... | ... | ... | ... |

TABLE 2

| | ACCESS ADDRESS | SEGMENT 0 | ACLC 0 | LRU 0 | SEGMENT 1 | ACLC 1 | LRU 1 | SEGMENT 2 | ACLC 2 | LRU 2 |
|---|---|---|---|---|---|---|---|---|---|---|
| 802 → | RESET | 0000 | 0 | 0 | 1000 | 0 | 0 | 2000 | 0 | 0 |
| 804 → | 0000_0010 | 0000 | 1 | 2 | 1000 | 0 | 0 | 2000 | 0 | 0 |
| 806 → | 0000_0110 | 0000 | 2 | 2 | 1000 | 0 | 0 | 2000 | 0 | 0 |
| 808 → | 1000_0210 | 0000 | 2 | 1 | 1000 | 1 | 2 | 2000 | 0 | 0 |
| 810 → | 2000_0310 | 0000 | 2 | 0 | 1000 | 0 | 1 | 2000 | 1 | 2 |
| 812 → | 2000_0210 | 0000 | 2 | 0 | 1000 | 1 | 1 | 2000 | 2 | 2 |
| 814 → | 4000_0210 | 0000 | 2 | 0 | 4000 | ... | 2 | 2000 | 2 | 1 |
| | ... | ... | ... | ... | ... | ... | ... | ... | ... | ... |

CACHE REPLACEMENT USING ACTIVE CACHE LINE COUNTERS

FIELD OF THE INVENTION

The present invention relates generally to the electrical, electronic, and computer arts, and more particularly relates to enhanced memory caching techniques.

BACKGROUND OF THE INVENTION

In computer engineering, a cache is a block of memory used for temporary storage of frequently accessed data so that future requests for that data can be more quickly serviced. As opposed to a buffer, which is managed explicitly by a client, a cache stores data transparently; thus, a client requesting data from a system is generally not aware that the cache exists. The data that is stored within a cache might be comprised of results of earlier computations or duplicates of original values that are stored elsewhere. Data cache is used to manage core accesses to the data information.

If requested data is contained in the cache, often referred to as a cache hit, this request can be served by simply reading the cache, which is comparably faster than accessing the data from main memory. Conversely, if the requested data is not contained in the cache, often referred to as a cache miss, the data is recomputed or fetched from its original storage location, which is comparably slower. Hence, the more requests that can be serviced from the cache, the faster the overall system performance. In this manner, caches are generally used to improve processor core (core) performance in systems where the data accessed by the core is located in comparatively slow and/or distant memory (e.g., double data rate (DDR) memory).

Since a cache is typically much smaller compared to main memory (for a number of reasons including, but not limited to, cost, system complexity, size, power consumption, etc.), data stored in the cache may need to be replaced by data used in a more recent calculation. There are various known cache algorithms, also referred to as cache replacement algorithms or cache replacement policies, designed to manage the information stored in the cache, such as, for example, least recently used (LRU), most recently used (MRU), random replacement, etc. Cache algorithms are essentially a set of optimizing instructions that a computer program or a hardware-maintained structure implements for managing a cache of information stored on the computer. When the cache is full, the cache algorithm selects which information in the cache to discard in order to make room for the newly requested information.

The hit rate of a given cache describes how often a requested data item is actually found in the cache. The latency of a cache describes how long after requesting a desired item the cache returns that item (when there is a cache hit); generally, it is desirable to keep the hit rate of the cache high while maintaining a low latency. Each cache replacement strategy represents a compromise between hit rate and latency, a ratio of hit rate and latency often being used as a cache performance indicator.

SUMMARY OF THE INVENTION

Principles of the invention, in illustrative embodiments thereof, advantageously improve caching performance in a memory system by using information regarding the number of active lines in a cache associated with a particular memory segment. Aspects of the invention utilize this information, along with other information relating to a state of the segment and/or states of cache lines associated with the segment (e.g., LRU state), to determine an optimal cache replacement policy for the memory system. In this manner, aspects of the invention beneficially enhance caching performance.

In accordance with one embodiment of the invention, an apparatus for performing data caching comprises at least one cache memory including multiple cache lines arranged into multiple segments, each segment having a subset of the cache lines associated therewith. The apparatus further includes a first plurality of counters, each of the counters being operative to track a number of active cache lines associated with a corresponding one of the segments. At least one controller included in the apparatus is operative to receive information relating to the number of active cache lines associated with a corresponding segment from the first plurality of counters and to implement a cache segment replacement policy for determining which of the segments to replace as a function of at least the information relating to the number of active cache lines associated with a corresponding segment.

In accordance with another embodiment of the invention, a method for performing data caching includes the steps of: receiving a main memory address for accessing requested data in a corresponding location in main memory, the main memory being organized into a plurality of segments, at least a portion of the memory address including a segment identifier referencing one of the plurality of segments; comparing segment identifiers corresponding to a plurality of segments in a segment memory with the segment identifier in the received main memory address for determining whether there is a segment match; for each of at least a subset of the plurality of segments, tracking a number of active cache lines in a cache memory associated with a corresponding one of the segments; and when a segment match has not occurred and the cache memory is full, implementing a cache segment replacement policy based at least on information relating to the number of active cache lines associated with a corresponding one of the segments.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein:

FIG. 4 is a table indicating respective states of active cache lines and LRU registers during exemplary memory accesses, according to an illustrative embodiment of the invention in which LRU information is employed in an exemplary cache replacement policy;

FIG. 8 is a table indicating respective states of active cache line counters and LRU registers during illustrative memory accesses, according to an illustrative embodiment of the invention in which information regarding the number of active cache lines associated with a given memory segment is used in an exemplary cache replacement policy;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention will be described herein in the context of illustrative embodiments of a methodology and corresponding apparatus for implementing a cache replacement policy in a segmented memory architecture using a novel active cache line counter approach. It is to be appreciated, however, that the invention is not limited to the specific methods or apparatus illustratively shown and described herein. Rather, aspects of the invention are directed broadly to techniques for enhancing the overall performance of data caching in a segmented memory architecture.

While illustrative embodiments of the invention will be described herein with reference to specific processor instructions (e.g., using C++, pseudo code, etc.), cache and address field formats, or alternative processor architectures, it is to be understood that the invention is not limited to use with these or any particular processor instructions, cache and address formats, and/or system architectures. Rather, principles of the invention may be extended to essentially any processor architecture (hardware or software), execution code, or address and cache organization. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
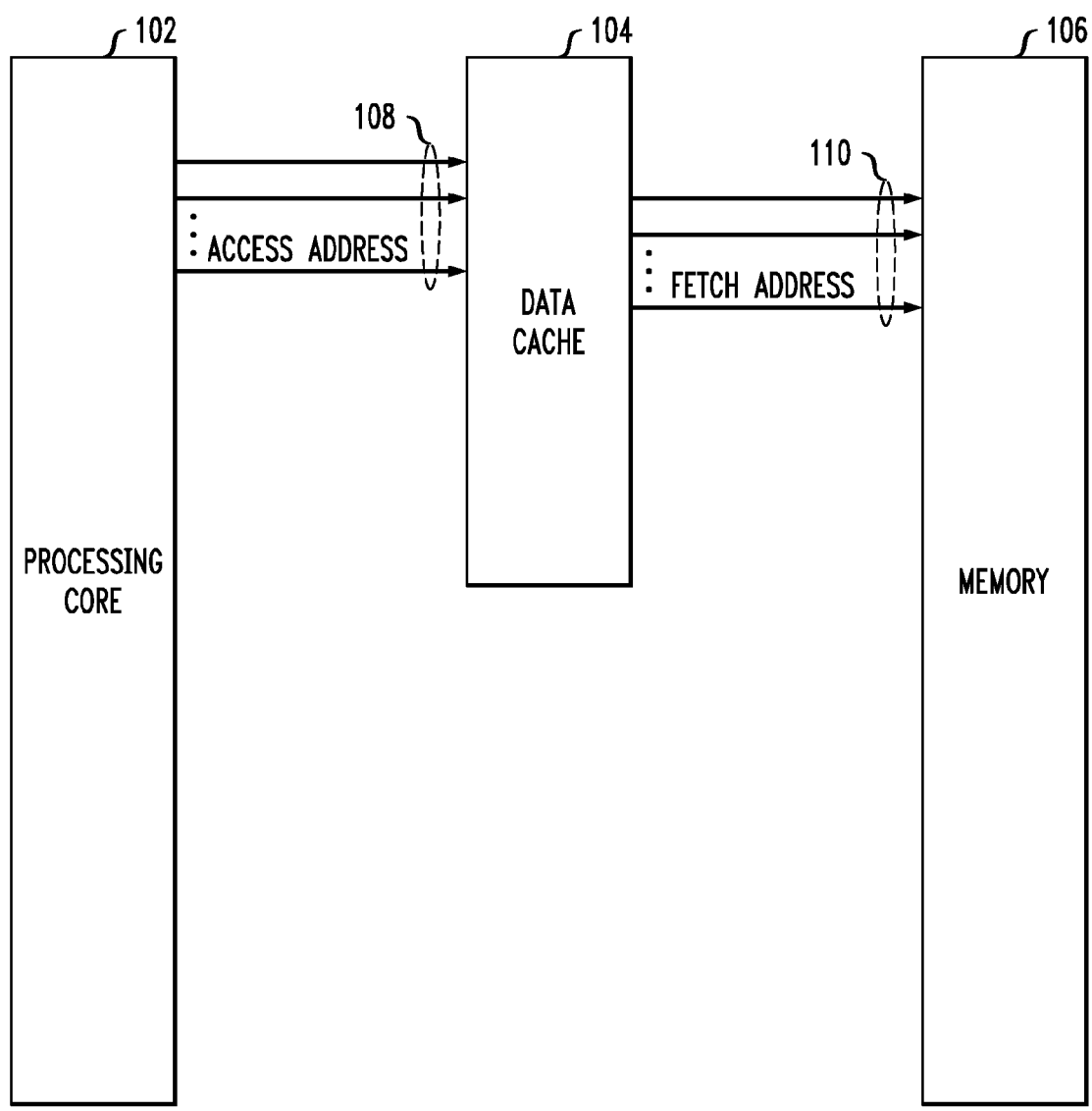
FIG. 1 is a block diagram illustrating at least a portion of an exemplary processing system is shown in which techniques of the present invention may be implemented.

As a brief overview, FIG. 1 is a block diagram illustrating at least a portion of an exemplary processing system 100 in which techniques of the present invention may be implemented. Processing system 100 includes a processing core 102, which may include, for example, a central processing unit (CPU), an arithmetic logic unit (ALU), etc., and a data cache 104 coupled with the processing core. Processing system 100 further includes main memory 106 operatively coupled with the processing core 102 via the data cache 104. Data cache 104 is comprised of memory that is separate from the processing core's main memory 106. Processor core 102, cache 104 and main memory 106 may be collocated within a single integrated circuit (e.g., as may be the case with a system-on-a-chip (SoC)), or one or more of the processor core, cache and memory may be separate from, but communicatively coupled with, the other components. Additionally, the present invention, according to embodiments thereof, is applicable to multi-level cache schemes where the main memory acts as a cache for an additional main memory (e.g., level-1 (L1) cache in static random access memory (SRAM), level-2 (L2) cache in dynamic random access memory (DRAM), and level-3 (L3) cache in a hard disk drive).

Data cache 104 is preferably considerably smaller, but faster in comparison to the main memory 106, although the invention is not limited to any particular size and/or speed of either the data cache or main memory. Data cache 104 essentially contains a duplicate of a subset of certain data stored in the main memory 106. For optimal efficiency, the subset of data stored in data cache 104 is ideally data frequently accessed by the processing core 102. Each of the storage locations in data cache 104 may be mapped to a corresponding location in main memory 106 using one or more of various known cache mapping techniques, such as, for example, direct mapping, fully associative mapping, set-associative mapping, etc. It is to be understood that the invention is not limited to any specific cache mapping scheme(s).

More particularly, a cache's associativity determines how many main memory locations map into respective cache memory locations. A cache is said to be fully associative if its architecture allows any main memory location to map into any location in the cache. A cache may also be organized using a set-associative architecture. A set-associative cache architecture is a hybrid between a direct-mapped architecture and a fully associative architecture, where each address is mapped to a certain set of cache locations. To accomplish this, the cache memory address space is divided into blocks of $2^m$ bytes (the cache line size), discarding the least significant (i.e., bottom) m address bits, where m is an integer. An n-way set-associative cache with S sets includes n cache locations in each set, where n is an integer. A given block B is mapped to set {B mod S} (where "mod" represents a modulo operation) and may be stored in any of the n locations in that set with its upper address bits as a tag, or alternative identifier. To determine whether block B is in the cache, set {B mod S} is searched associatively for the tag. A direct-mapped cache may be considered "one-way set associative" (i.e., one location in each set), whereas a fully associative cache may be considered "N-way set associative," where N is the total number of blocks in the cache.

When the processing core 102 requires certain data, either in performing arithmetic operations, branch control, etc., an address (memory access address) 108 for accessing a desired memory location or locations is sent to data cache 104. If the requested data is contained in data cache 104, referred to as a cache hit, this request is served by simply reading the cache data at the supplied memory address 108. Conversely, when the requested data is not found in data cache 104, referred to as a cache miss, a fetch address 110, which is indicative of the memory access address 108, is sent to main memory 106 where the data is then fetched into cache 104 from its original storage location in the main memory and also supplied to the processing core 102. Data buses, or alternative connection means, used to transfer data between the processor and the data cache, and between the data cache to main memory are not shown in FIG. 1 for clarity purposes, although such bus connections are implied, as will be known by the skilled artisan. On a practical level, since data cache 104 cannot hold the same amount of data as main memory 106, the cache mapping scheme controls how data is transferred between the data cache and main memory.

Figure 2A:
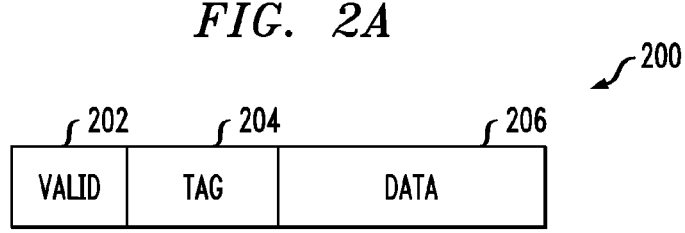
FIG. 2A is a conceptual view depicting an illustrative organization of a cache block (i.e., cache line) in an exemplary data cache structure.

A data cache can be easily visualized as an array of elements. These elements may be referred to as "cache blocks" or "cache lines" (i.e., cache row entries). With reference now to FIG. 2A, an illustrative cache line 200 in an exemplary data cache structure is shown. Each cache line 200 is preferably organized into a plurality of fields, each field comprising a subset of the total number of storage bits in a given cache row entry. By way of example only and without limitation, cache line 200 includes a valid field 202 comprising one or more bits (e.g., a dirty bit) indicating whether the data in this cache line is valid, a tag field 204 comprising one or more significant bits of a memory address corresponding to data stored in a data field 206 of the cache line; the data field 206 stores the actual data fetched from main memory. It is to be understood that the invention is not limited to any specific arrangement of the cache line 200. For example, a given cache line may include more (or less) fields than those illustratively depicted in FIG. 2A.

Figure 2B:
FIG. 2B is an illustrative arrangement for a requested memory address generated by a processor in the context of a direct mapping address structure.

When the processor requests to read or write a location in main memory, it first checks whether the requested memory location is in the cache. This may be accomplished, for example, by comparing the address of the memory location to tags in the cache that might contain that address. A cache hit is indicative of the processor finding the requested memory location in the cache; otherwise, a cache miss has occurred. An effective memory address generated by the processor may utilize an exemplary arrangement as shown in FIG. 2B, at least in the context of a direct mapping address structure. Specifically, the requested memory address 220 may be organized into a plurality of fields, including a tag field 222, an index field 224, and a displacement (i.e., offset) field 226. In a direct mapping cache scenario, the least significant $log_2$ (cache line size) bits of the address 220 preferably form the displacement field 226 that defines which byte is in the block, the next higher $log_2$(number of cache lines) bits of the address form the index field 224 defining which line of the cache is being referenced, and the remaining most significant bits (MSB) of the address form the tag field. It is to be appreciated that the invention is not limited to any specific arrangement of the address 220; rather, alternative organizations of bits and respective fields forming a given memory address are similarly contemplated and may vary as a function of the type of cache mapping scheme employed.

Figure 2C:
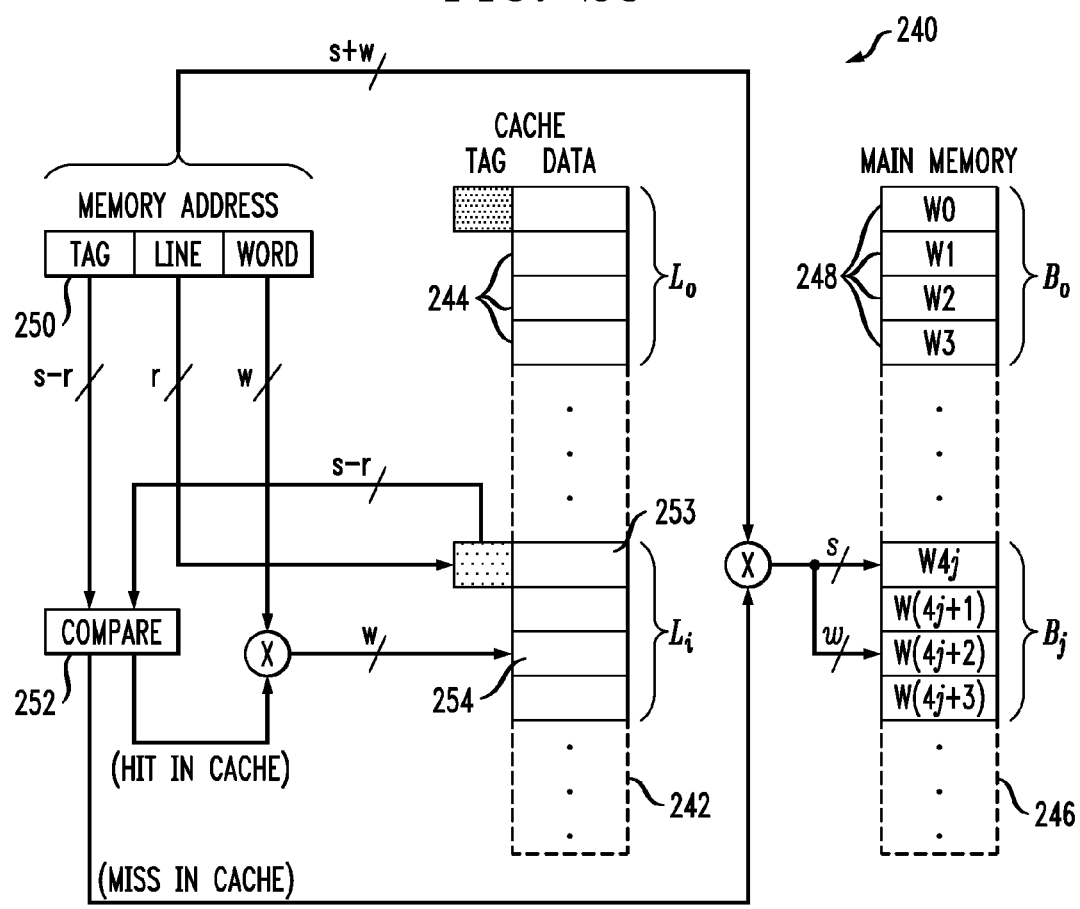
FIG. 2C is a conceptual view depicting an exemplary direct mapping cache system in which techniques of the invention may be implemented.

FIG. 2C is a conceptual view depicting an exemplary direct mapping cache system 240 in which techniques of the invention may be implemented. Cache system 240 includes a data cache 242 comprising a plurality of cache blocks (i.e., cache lines) 244, 253 and 254, and main memory 246 comprising a plurality of memory locations 248. More than one memory location may be used to form a block of data in the main memory 246. For example, a first data block, $B_0$, in main memory 246 may include four data words (W0, W1, W2 and W3); a j-th data block, $B_j$, may include four data words (W4j, W(4j+1), W(4j+2) and W(4j+3)), where j is an integer. It is to be understood that the invention is not limited to any specific number of words in a given data block.

A memory address 250 is generated by a processor core when a memory access (e.g., read or write) is requested. The memory address includes a tag field, a line field and a word field, which corresponds to tag field 222, index field 224 and displacement field 226, respectively, in the address 220 shown in FIG. 2B. The memory address 250 comprises s+w bits, where s is an integer representing a first portion of the memory address which points to a starting location of a selected data block in the main memory 246 and w is an integer representing a second portion of the memory address which is indicative of an offset from the given starting location of the selected data block. The word field comprises the w least significant bits (LSB) of the address 250, where w represents the offset from a cache line number identified by the memory address, the line field comprises the next higher r bits of the memory address identifying the cache line number that a particular block maps to, and the tag field comprises the remaining s−r most significant bits of the memory address which distinguishes cache blocks that map to the same cache line (e.g., $2^{(s-r)}$ blocks map to the same cache line).

When a memory access is requested by the processor, the tag field of the requested memory address 250 is compared to the tag field of a cache line 253 identified by the line field in the memory address, for example using a comparator 252 or alternative comparison means. If the two tag fields match, a cache hit is said to occur, at which point data is accessed in a given cache line 254 in a block ($L_j$) of cache lines beginning with the identified cache line 253 and offset by the word field in the memory address 250. When the two tag fields do not match, a cache miss is said to occur indicating that the requested access location does not reside in the cache 242, at which point access is redirected to a location in main memory 246 identified by memory address 250.

In order to reduce the number of bits in the tag field of a given memory address, thereby improving speed and power consumption in a memory system, the main memory (e.g., 106 in FIG. 1) may be logically segmented into a plurality of memory subsections. Preferably, each of the memory subsections are of equal size relative to one another and are non-overlapping, meaning that each memory subsection contains a uniquely addressable storage location, although the invention is not limited to any particular size or number of the subsections and/or any specific configuration of the memory. Using this approach, a reduced number of bits of main memory addresses are preferably stored in the tag memory (i.e., tag fields); one or more MSBs of the main memory addresses are stored as segment identifiers in one or more "segment" memories associated with the tag memory. In embodiments in which more than one memory segment may be cached at a time, segment pointers may be stored in the tag memory to accommodate multiple segment registers. This approach may also be used to support virtual segments.

When a cache miss occurs, a block of data which includes the data requested by the processor is fetched from main memory and stored somewhere in the data cache. If the cache is not already full, the data is simply stored in the next available memory location in the cache. However, the decision as to which location in the cache to store the fetched blocks of data becomes more complex when the data cache has no available unused storage locations. In this instance, a cache replacement policy is typically implemented to determine which data in the cache is to be discarded and replaced by the newly retrieved data. A cache replacement policy, also referred to as a replacement algorithm or cache algorithm, is a set of optimizing instructions executed by a processor and/ or a hardware-maintained structure that controls information storage in a cache. When the cache is full, the replacement policy is tasked with choosing which data to discard to make room for newly retrieved data.

There are various known cache replacement policies all of which essentially seek to optimize the replacement of cache data so that data most likely to be immediately used is retained and data that is least likely to be immediately used is replaced. Perhaps the most efficient caching algorithm would be to always discard information that will not be needed for the longest time in the future. This optimal objective is often referred to as Belady's algorithm or the clairvoyant algorithm. Unfortunately, however, it is generally impossible to predict how far in the future data will be needed, and thus Belady's algorithm is generally not implementable in practice. Embodiments of the invention will be described herein in the context of an LRU cache replacement policy (i.e., algorithm), although it is to be appreciated that alternative replacement methodologies may be similarly employed, including, but not limited to, first-in-first-out (FIFO), least frequently used (LFU), pseudo-LRU (PLRU), most recently used (MRU), and random replacement caching algorithms.

In a segmented memory architecture, one or more segments of the main memory are cached at a time. Any access to an address space outside a cached main memory segment will cause a cache segment miss to occur. A cache segment miss flushes or otherwise invalidates data in one of the already-cached (i.e., active) segments as needed and according to the particular cache segment replacement policy employed. The corresponding segment register may then be loaded with a different value corresponding to a different main memory segment, and that different segment is then cached.

Figure 3A:
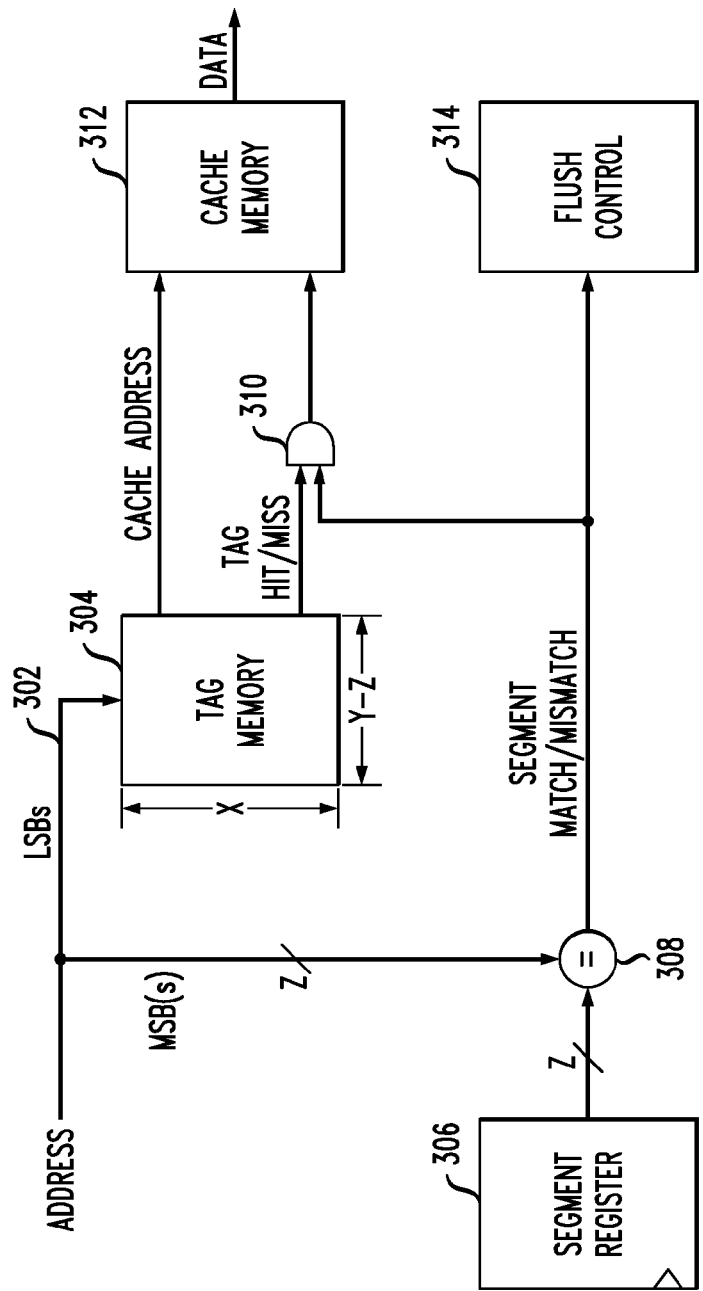
FIG. 3A is a block diagram depicting at least a portion of an exemplary cache memory system in which one or more aspects of the invention may be implemented.

FIG. 3A is a block diagram depicting at least a portion of an exemplary cache memory system 300 in which one or more aspects of the invention may be implemented. Cache memory system 300 is adapted to receive a requested main memory address (ADDRESS) via an address bus 302, or alternative connection means. In this embodiment, cache memory system 300 is configured for use in conjunction with a segmented main memory architecture. For purposes of this discussion, it is assumed that all segments are of equal size and are divided in such a way that the largest possible number of MSBs is common to all addresses in each segment. For instance, a 32 megabyte (MB) main memory may be logically divided into four equal 8 MB segments, with the two MSBs of the address common to all addresses in each of the four segments. It is to be understood, however, that the invention is not limited to any specific memory configuration and that alternative memory arrangements are similarly contemplated by the invention.

As shown in FIG. 3A, cache memory system 300 includes a tag memory 304 which is preferably organized as a Cartesian (x-y) coordinate array capable of storing x tags of length (y-z) bits, where x, y and z are all integers and y is indicative of the total number of bits in the memory address. At least a portion of the remaining z MSBs of the address are used to identify a particular segment in the main memory and are stored in a segment memory 306, which may comprise, for example, a z-bit wide segment register.

In order to determine whether or not the requested main memory address supplied to cache memory system 300 is a cache hit or miss, a comparator 308 compares the z MSBs of the address with the segment identifier stored in the segment memory 306. If the z MSBs of the address do not match the segment identifier, a segment miss has occurred, and a signal indicative of a segment mismatch (e.g., logical zero) is provided to a first input of a functional AND gate 310. Conversely, if the z MSBs of the address match the segment identifier, a potential segment hit has occurred, and a signal indicative of a segment match (e.g., logical one) is provided to the first input of functional AND gate 310.

Concurrently, the remaining y-z bits of the requested memory address are routed to the tag memory 304. Conventional logic circuitry associated with the tag memory 304 is operative to compare the y-z bits of the memory address with the corresponding y-z bits contained in the respective x tags in tag memory 304. If a match does not occur, a segment miss has occurred, and a signal indicative of a tag miss (e.g., logical zero) is provided to a second input of functional AND gate 310. Conversely, if the y-z bits of the memory address matches the corresponding y-z bits contained in the tag memory 304, a potential segment hit has occurred, and a signal indicative of a tag hit (e.g., logical one) is provided to the second input of functional AND gate 310. The comparator 308 and AND gate 310 may be regarded as combinatorial logic. In one embodiment, the combinatorial logic resides in a memory controller (not explicitly shown) in the memory system.

If both a tag hit and a segment match occur, a segment hit results and a signal indicative of a segment hit (e.g., logical one) is generated as an output of AND gate 310. Both the cache address and the output of AND gate 310 are provided to cache memory 312, which may be representative of data cache 104 shown in FIG. 1, which fulfills the data request with data (DATA) as an output of the cache memory as shown. Alternatively, if either a tag miss or a segment mismatch occurs, a segment miss results and a signal indicative of a segment miss (e.g., logical zero) is generated as an output of AND gate 310. In this instance, the output of AND gate 310 prevents the cache memory 312 from fulfilling the data request.

The output of comparator 308 (which generates the signal indicative of whether or not a segment mismatch has occurred) is also provided to a controller, which may be a flush control unit 314. If a segment mismatch occurs (e.g., logical zero output from comparator 308), flush control unit 314 is preferably operative to determine whether or not the requested data is cacheable. If the requested data is cacheable, flush control unit 314 invalidates the segment and flushes it if needed, loads the segment register 306 with the new segment value, directs the memory controller to fulfill the data request, and caches the requested data when the data request is ultimately fulfilled. Conversely, if a segment match occurs (e.g., logical one output from comparator 308), flush control unit 314 is preferably operative to determine whether or not a hit has occurred with regard to the other y-z bits of the address. If a hit has occurred, cache memory 312 fulfills the data request; if not, flush control unit 314 directs the main memory controller to fulfill the data request from the main memory (e.g., memory 106 in FIG. 1) and updates cache memory 312 in accordance with a cache replacement policy.

Figure 3B:
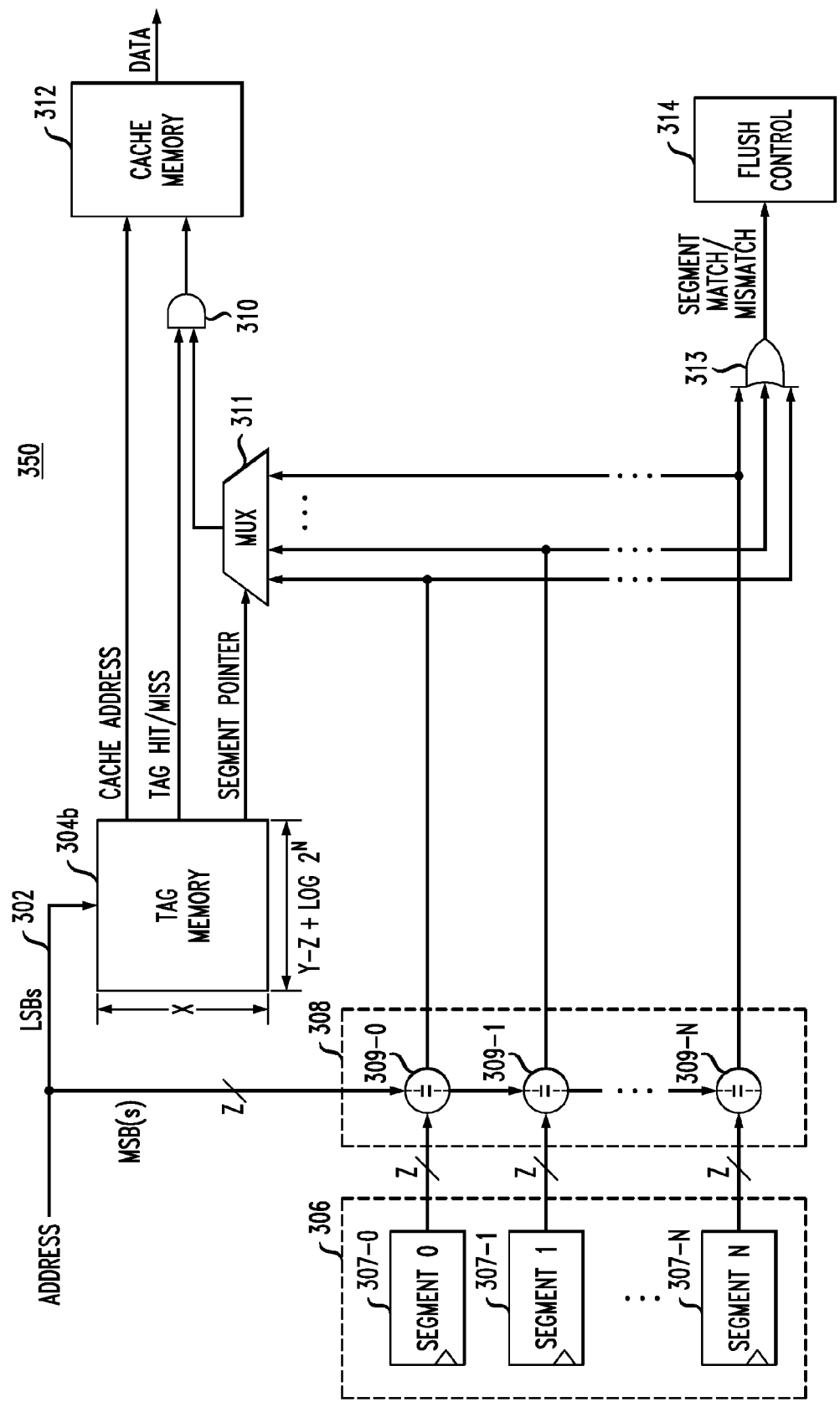
FIG. 3B is a block diagram depicting at least a portion of another embodiment of an exemplary cache memory system in which multiple memory segments can be cached concurrently, and wherein one or more aspects of the invention may be implemented.

FIG. 3B is a block diagram depicting at least a portion of another embodiment of an exemplary cache memory system 350 in which multiple memory segments can be cached concurrently, and wherein one or more aspects of the invention may be implemented. Cache memory system 350 is similar to the cache memory system 300 shown in FIG. 3A, except that the segment memory 306 comprises a plurality of z-bit wide segment registers, 307-0, 307-1, through 307-N, where N+1 represents the total number of segment registers in the segment memory. Of course, in other embodiments, segment memory 306 may be implemented as a single memory configured to contain multiple segment identifiers. Moreover, comparator 308 in cache memory system 350 comprises a plurality of comparators, 309-0, 309-1, through 309-N, with each comparator being connected with a corresponding one of the segment registers and each comparator receiving, as a common input signal, the z MSBs of the requested main memory address (ADDRESS) supplied to the cache memory system.

Tag memory 304b in cache memory system 350 is also slightly larger than tag memory 304 shown in FIG. 3A to accommodate tags that are y-z+log $2^N$ bits long (compared to tags that are y-z bits long). The additional log $2^N$ bits are preferably used as a segment pointer to associate each tag in the tag memory 304b with a corresponding one of the segment registers 307-0, 307-1, through 307-N. The segment pointer from a matching tag in the tag memory 304b is also supplied to a segment multiplexer (MUX) 311. Concurrently, the MSBs routed to comparators 309-0, 309-1, through 309-N are compared with segment identifiers contained in the corresponding segment registers 307-0, 307-1, through 307-N. Results of the respective comparisons generated by comparators 309-0, 309-1, through 309-N are supplied to the segment multiplexer 311. Segment multiplexer 311 is operative to select one of the comparator outputs as a function of the segment pointer generated by the tag memory 304b. The comparator outputs are concurrently supplied to an N+1 input function OR gate 313 operative to determine whether or not a segment match has occurred. If any one of the comparator outputs is a logical one (i.e., high level), indicative of a match between the requested main memory address and one of the segment identifiers in the segment memory 306, OR gate 313 will generate an active (e.g., logic high) output signal indicative of a segment match. A segment match signal causes the flush controller 314 to operate as previously described in conjunction with cache memory system 300 shown in FIG. 3A.

Segmented cache architectures typically employ an LRU or LRU-like cache replacement policy. As the name suggests, an LRU cache replacement policy discards least recently used data first. To accomplish this, the LRU algorithm is preferably operative to keep track of when data is used, such as, for example, by monitoring "age bits" corresponding to the respective cache segments and tracking the least recently accessed cache segment based on a status of the corresponding age bits. In such an implementation, each time a cache segment is accessed, the age bits of all the other cache segments are updated (e.g., by incrementing a counter or an alternative tracking means). When newly fetched data needs to be stored in the cache, the cache segment(s) least recently accessed are replaced first.

An LRU cache segment replacement policy is often non-optimal, however, because it only considers temporal information (i.e., time-based information as to when a given cache segment was recently accessed), but does not take into account information pertaining to how many active lines in the cache belong to a particular segment and how many cache lines belonging to that segment were recently accessed. Thus, using a standard LRU cache replacement policy, a segment having no active lines in the cache may remain in the memory, while a segment having may active lines may be replaced. An illustrative scenario which highlights certain disadvantages of an LRU cache segment replacement policy is described below in conjunction with Table 1 shown in FIG. 4.

By way of illustration only and without limitation, assume for simplicity an example scenario in which there are three segments (segment 0, segment 1 and segment 2) and one-way set associative caching (i.e., direct mapping) is used. Furthermore, assume that the 16 MSBs of the memory address (access address) are used to identify a given one of the segments; address bits following the 16 MSBs indicate at least a portion of a requested memory address. With reference to FIG. 4, table 1 indicates respective states of active cache lines and LRU registers during exemplary memory accesses, according to an illustrative embodiment of the invention. The active lines and LRU registers may be implemented as counters, although alternative means for tracking how many times a given segment is accessed (in the case of the active lines registers) and/or how often a segment is used (in the case of the LRU registers) are contemplated by the invention.

More particularly, in row 402 of table 1, a reset is initiated. During a reset, all active lines registers and LRU registers for segments 0 through 3 are preferably initialized to zero. In row 404, segment 0 is accessed. Accordingly, the active lines register corresponding to segment 0 is incremented by one (e.g., to "1"), indicative of segment 0 being accessed one time, and the LRU register corresponding to segment 0 is set to "2" (a maximum count value in this example). In this embodiment, the LRU register for a given segment is preferably a counter which is set to a prescribed count value (e.g., "2") and is then decremented by one for each successive memory request that the given segment is not accessed until the counter reaches a prescribed minimum value (e.g., zero). In row 404, active lines and LRU registers corresponding to the other segments (i.e., segments 1 and 2) remain unchanged at zero. In row 406, segment 0 is again accessed. The active lines register corresponding to segment 0 is therefore incremented by one (e.g., to "2"), indicative of segment 0 being accessed two times, and the LRU register corresponding to segment 0 is again set to its maximum prescribed value (e.g., "2").

In row 408, segment 1 is accessed. The active lines register corresponding to segment 1 is therefore incremented by one (e.g., to "1"), indicative of segment 1 being accessed one time, and the LRU register corresponding to segment 1 is set to its maximum prescribed value (e.g., "2"). The active lines registers corresponding to segments 0 and 2 remain at their previous values (e.g., "2" and "0," respectively). The LRU register for segment 0 is decremented by one (e.g., to "1") since segment 0 was not accessed during the current memory request, and the LRU register corresponding to segment 2 remains at zero.

In row 410, segment 2 is accessed. The active lines register corresponding to segment 2 is therefore incremented by one (e.g., to "1"), indicative of segment 2 being accessed one time, and the LRU register corresponding to segment 2 is set to its maximum prescribed value (e.g., "2"). The active lines registers corresponding to segments 0 and 1 remain at their previous values (e.g., "2" and "1," respectively). The LRU register for segment 0 is again decremented by one (e.g., to "0") and the LRU register corresponding to segment 1 is decremented by one (e.g., to "1") since segments 0 and 1 were not accessed during the current memory request.

In row 412, segment 2 is again accessed replacing a line from segment 1. The active lines register corresponding to segment 2 is therefore incremented by one (e.g., to "2"), indicative of segment 2 being accessed two times, and the LRU register corresponding to segment 2 is again set to its maximum prescribed value (e.g., "2"). The active lines registers corresponding to segment 0 remains at its previous values (e.g., "2"). The LRU register for segment 0 remains at its minimum value (e.g., to "0"). Since a line from segment 1 has been replaced, the active lines register corresponding to segment 1 is decremented by one (e.g., to "1") and the LRU register corresponding to segment 1 remains at its previous value (e.g., "1").

In row 414, access to a new segment is requested which does not match the segment addresses in the segment register (i.e., a segment miss occurs). In this instance, the LRU cache replacement policy compares the values in the LRU registers for segments 0, 1 and 2 to determine which segment has been used most recently. Since segment 0 has the lowest value in its LRU register (e.g., "0") prior to the current memory request, thus indicating that segment 0 has been used less frequently compared to segments 1 and 2, segment 0 is replaced by the new segment (with address 4000). The active lines register corresponding to segment 0 is then incremented by one (e.g., to "1"), indicating that new segment 0 has been accessed one time, and the LRU register corresponding to segment 0 is set to its maximum prescribed value (e.g., "2"). The active lines registers corresponding to segments 1 and 2 remain at their previous values, since these segments are not being accessed during this memory request, and the LRU registers corresponding to segments 1 and 2 are each decremented by one (e.g., to "0" and "1," respectively).

As apparent from the above illustrative scenario, segment 0 is replaced with the new segment despite the fact that the number of active cache lines in segment 0 is higher compared to segment 1, thus suggesting that segment 1 should be replaced rather than segment 0. The present invention, in accordance with embodiments thereof, addresses at least the above-noted problem by tracking not only how recently a given segment has been accessed (e.g., LRU), but also by tracking information regarding the number of active cache lines associated with the given segment. A cache replacement policy, which may be implemented during cache misses and/or prefetch, is provided which is a function of at least the information regarding the number of active cache lines associated with the given segment. In other embodiments, the information regarding the number of active cache lines associated with the segments is preferably employed in conjunction with LRU information pertaining to the cache lines to determine a more optimal cache replacement policy. In this manner, cache performance can be significantly improved compared to conventional caching methodologies.

Figure 5:
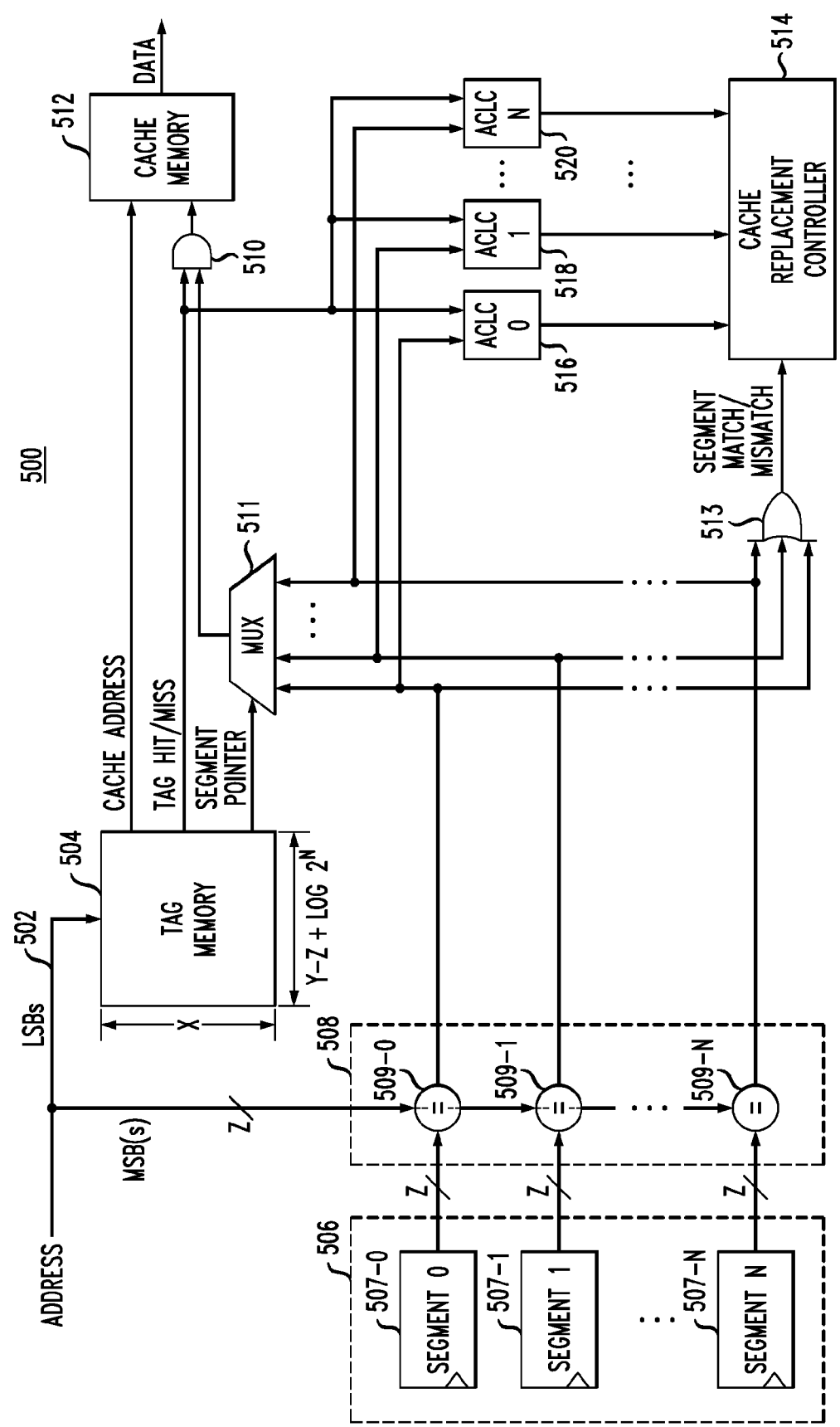
FIG. 5 is a block diagram illustrating at least a portion of an exemplary cache memory system, according to an embodiment of the present invention.

With reference now to FIG. 5, a block diagram illustrating at least a portion of an exemplary cache memory system 500 is shown, according to an embodiment of the invention. Cache memory system 500 is adapted to receive a requested main memory address (ADDRESS) via an address bus 502, or an alternative connection arrangement. In this embodiment, cache memory system 500 is configured for use in conjunction with a segmented main memory architecture. For purposes of this discussion, it is assumed that all segments are of equal size and are divided in such a way that the largest possible number of MSBs is common to all addresses in each segment. It is to be understood, however, that the invention is not limited to any specific memory configuration and that alternative memory arrangements are similarly contemplated by the invention.

As shown in FIG. 5, cache memory system 500 includes a tag memory 504 which is preferably organized as a Cartesian (x-y) coordinate array capable of storing x tags of length $(y-z+\log 2^N)$ bits, where x, y and z are all integers and y is indicative of the total number of bits in the memory address. Tag memory 504 is slightly larger than tag memory 304 shown in FIG. 3A to accommodate tags that are $y-z+\log 2^N$ bits long (compared to tags that are y-z bits long). Like the tag memory 304*b* shown in FIG. 3B, the additional $\log 2^N$ bits are preferably used as a segment pointer to associate each tag in the tag memory 504 with a corresponding one of the segment registers 507-0, 507-1, ... 507-N. The segment pointer from a matching tag in the tag memory 504 is also supplied to a segment multiplexer (MUX) 511.

At least a portion of the remaining z MSBs of the requested main memory address are used to identify a particular segment in the main memory and are stored in a segment memory 506, which may comprise, for example, one or more z-bit wide segment registers. In this embodiment, segment memory 506 comprises a plurality of segment registers, 507-0, 507-1, ... 507-N, where the total number of segment registers in segment memory 506 is equal to N+1. Of course, the invention is not limited to any specific number of segment registers.

In order to determine whether or not the requested main memory address supplied to cache memory system 500 is a cache hit or miss, a comparator 508 compares the z MSBs of the address with the respective segment identifiers stored in the segment registers 507-0 through 507-N. Comparator 508 in this embodiment comprises a plurality of individual comparators, 509-0, 509-1, ... 509-N. A first input of each comparator 509-0 through 509-N is coupled with and is adapted to receive an output of a corresponding segment register 507-0 through 507-N, respectively. A second input of the comparators 509-0 through 509-N preferably receive, as a common signal, the z MSBs from the requested main memory address. Each of the comparators 509-0 through 509-N is operative to compare the z MSBs of the address with the z-bit wide segment identifier from a corresponding segment register 507-0 through 507-N, respectively, and generates an output signal (e.g., logic one or logic zero) indicative of whether or not a segment match is found.

If the z MSBs of the requested main memory address do not match any of the segment identifiers in segment memory 506, a segment miss has occurred, and a signal indicative of a segment mismatch (e.g., logical zero) is provided to a first input of a functional AND gate 510 via the segment multiplexer 511. Segment multiplexer 511 is operative to select one of the comparator outputs generated by comparator 508 as a function of the segment pointer generated by tag memory 504. Alternatively, if the z MSBs of the requested main memory address match any one of the segment identifiers in segment memory 506, a potential segment hit has occurred, and a signal indicative of a segment match (e.g., logical one) is provided to the segment multiplexer 511. The segment pointer generated by tag memory 504 will cause the segment multiplexer 511 to select the corresponding segment match signal and supply this signal to the first input of functional AND gate 510.

Concurrently, the remaining y-z bits of the requested main memory address are routed to tag memory 504. Conventional logic circuitry associated with tag memory 504 is operative to compare the y-z bits of the memory address with the corresponding y-z bits contained in the respective x tags in tag memory 504. If a match does not occur, a tag miss has occurred, and a signal indicative of a tag miss (e.g., logical zero) is provided to a second input of functional AND gate 510. Conversely, if the y-z bits of the memory address matches the corresponding y-z bits contained in the tag memory 304, a potential tag hit has occurred, and a signal indicative of a tag hit (e.g., logical one) is provided to the second input of functional AND gate 510. The comparator 508, segment multiplexer 511, and AND gate 510 may be regarded as combinatorial logic. In one embodiment, the combinatorial logic resides in a memory controller (not explicitly shown) in the memory system.

If both a tag hit and a segment match occur, a segment hit results and a signal indicative of a segment hit (e.g., logical one) is generated as an output of AND gate 510. Both a cache address, which is generated by tag memory 504 based on the requested main memory address, and the output of AND gate 510 are provided to cache memory 512, which may be representative of data cache 104 shown in FIG. 1, which fulfills the data request with data (DATA) as an output of the cache memory as shown. Alternatively, if either a tag miss or a segment mismatch occurs, a segment miss results and a signal indicative of a segment miss (e.g., logical zero) is generated as an output of AND gate 510. In this instance, the output of AND gate 510 prevents the cache memory 512 from fulfilling the data request, and instead the data is retrieved directly from main memory (e.g., memory 106 in FIG. 1).

The respective outputs of comparator 508 are concurrently supplied to an N+1 input functional OR gate 513 operative to determine whether or not a segment match has occurred. The output of the OR gate 513 is supplied to a controller, which may be a cache replacement controller 514, operative to implement a cache replacement policy for effectively managing cache memory 512. If none of the comparator outputs is a logical one (i.e., high level), indicative of a match between the z MSBs of the requested main memory address and one of the segment identifiers in the segment memory 506, OR gate 513 will generate an inactive (e.g., logical zero) output signal indicative of a segment mismatch. Conversely, if the z MSBs of the requested main memory address match any one of the segment identifiers in segment memory 506, a potential segment hit has occurred, and a signal indicative of a segment match (e.g., logical one) is generated by OR gate 513 and provided to controller 514. If a segment mismatch occurs, controller 514 is preferably operative to determine whether or not the requested data is cacheable. If the requested data is cacheable, controller 514 invalidates the segment and flushes it if needed, loads the segment memory 506 with the new segment value, directs the memory controller to fulfill the data request, and caches the requested data when the data request is ultimately fulfilled. Conversely, if a segment match occurs, controller 514 is preferably operative to determine whether or not a tag hit has occurred with regard to the other y-z bits of the requested main memory address. If a hit has occurred, cache memory 512 fulfills the data request; if not, controller 514 directs the main memory controller to fulfill the data request from the main memory and updates the cache memory 512 in accordance with the cache replacement policy.

In order to track information regarding the number of active cache lines associated with each of the memory segments serviced by the cache, cache memory system 500 includes a plurality of active cache line counters (ACLCs) 516, 518, . . . 520. Each ACLC corresponds to a given one of the segment registers 507-0, 507-1, . . . 507-N, respectively, in segment memory 506. The invention is not limited to any specific number of ACLCs. The ACLCs are preferably updated (e.g., incremented or decremented) on every cache line replacement caused by a cache miss, software or hardware prefetch, or one or more cache line invalidations. Information from the ACLCs is provided to controller 514 and is used by the cache replacement policy implemented by controller 514 in determining which segment to replace in the event of a cache miss. Operation of an exemplary ACLC will now be described in conjunction with FIG. 6.

Figure 6:
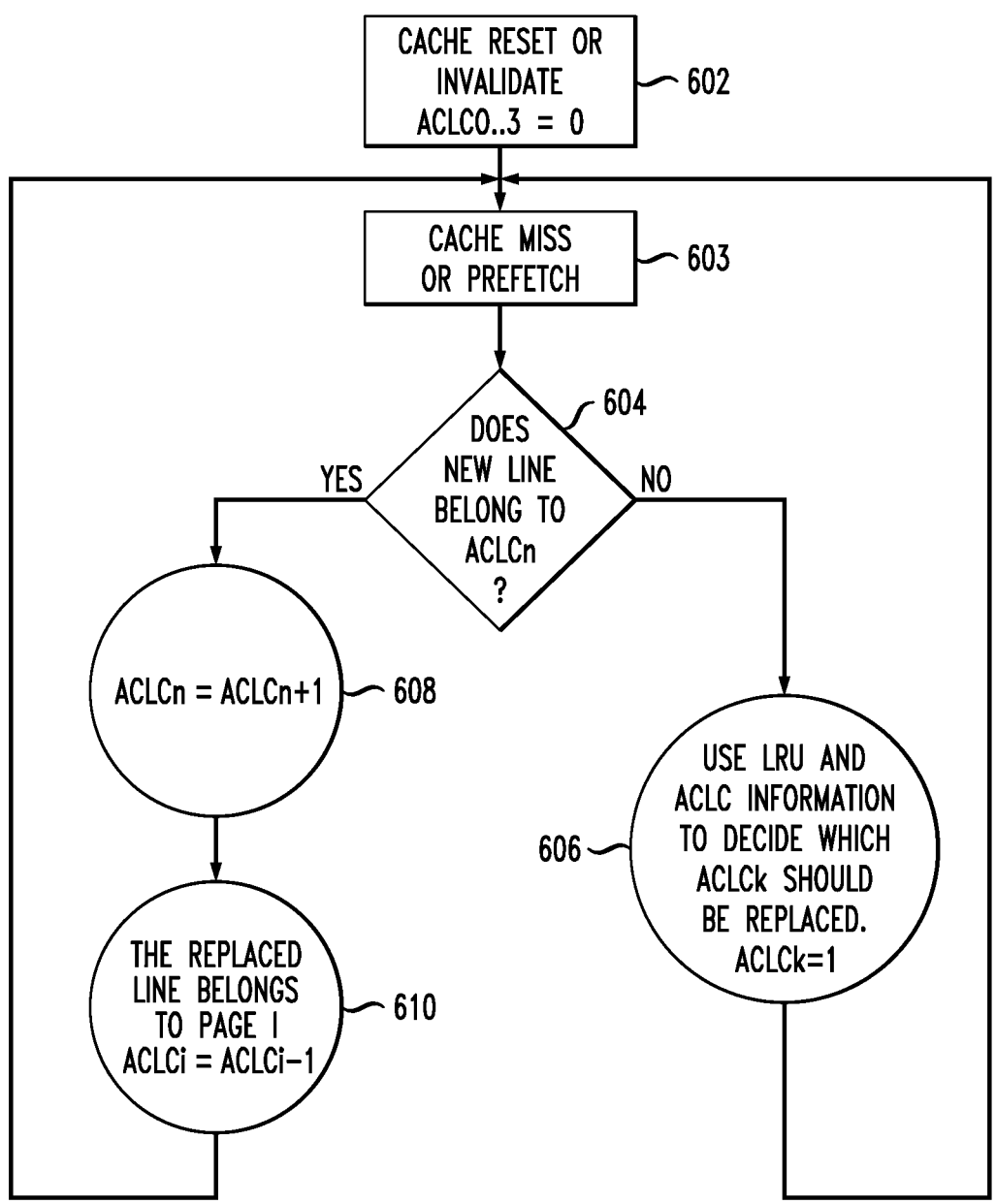
FIG. 6 is a logical flow diagram depicting a control methodology associated with one or more exemplary active cache line counters in the cache memory system of the present invention, according to an illustrative embodiment thereof.

FIG. 6 is a logical flow diagram 600 depicting a control methodology associated with one or more exemplary ACLCs in the cache memory system of the present invention, according to an illustrative embodiment thereof. By way of example only and without limitation, it is assumed for simplicity that the cache memory system is able to service four memory segments simultaneously, and thus four ACLCs are preferably employed, ACLC0, ACLC1, ACLC2 and ACLC3, or more generally, ACLCn, where n is an integer from 0 to 3. As previously stated, however, the invention is not limited to any specific number of memory segments or corresponding ACLCs.

As apparent from FIG. 6, upon receipt of a reset or invalidate signal from the cache memory system (e.g., as may be initiated by a memory controller or alternative control circuitry in the memory system), the ACLCs, namely, ACLC0 . . . 3 are set to a prescribed initial count value, which may be zero, in step 602. Control then proceeds to step 603, where the control circuitry in the cache memory system waits for a cache miss or prefetch to occur.

When a cache miss or prefetch occurs, the control circuitry, in step 604, is preferably operative to determine whether or not the new cache line requested by the main memory address is associated with one of ACLC0 . . . 3 (i.e., ACLCn, n=[0:3]). If the new cache line does not belong to one of the active segments and associated ACLCs, ACLC information, and optionally LRU information, is used in step 606 to determine which ACLC (ACLCk, where k is an integer indicative of a given one of the ACLCs) in the cache memory system should be replaced. Once a given one of the ACLCs, namely ACLCk, is selected for replacement, that ACLCk is set to a prescribed count value, which may be one (i.e., ACLCk=1). Control then proceeds to step 603 where the method waits for the next cache miss or prefetch.

If it is determined that the new cache line does belong to one of the active segments and associated ACLCs, the ACLC associated with the new cache line, namely, ACLCn, is incremented in step 608 by a prescribed value, preferably one (i.e., ACLCn=ACLCn+1). Alternative methodologies for tracking active cache lines are similarly contemplated. For example, in accordance with other embodiments, ACLCn can be decremented by a prescribed value, as in a countdown tracking approach (i.e., ACLCn=ACLCn−1). Once ACLCn associated with the new cache line is incremented (or decremented, as the case may be), the replaced cache line is associated with page I (where I is an integer indicative of the associated page) and ACLCi is decremented by a prescribed amount, preferably one (i.e., ACLCi=ACLCi−1, where i is an integer), in step 610. During cache line replacement, a new line is preferably brought into the cache and one line is removed. The line brought into the cache causes the corresponding ACLCn to be incremented, while the line removed from the cache causes the corresponding ACLCk to be decremented. Control then proceeds to step 603 where the method waits for the next cache miss or prefetch.

As previously stated, the cache replacement policy, in determining which cache segment to replace, utilizes at least information regarding the number of active cache lines associated with a given memory segment. The ACLCs discussed in connection with FIGS. 5 and 6 are operative to track the number of active cache lines associated with each of the memory segments and to provide such information to the controller implementing the cache replacement policy. Optionally, the cache replacement policy also utilizes LRU information pertaining to cache lines associated with the memory segments.

Figure 7:
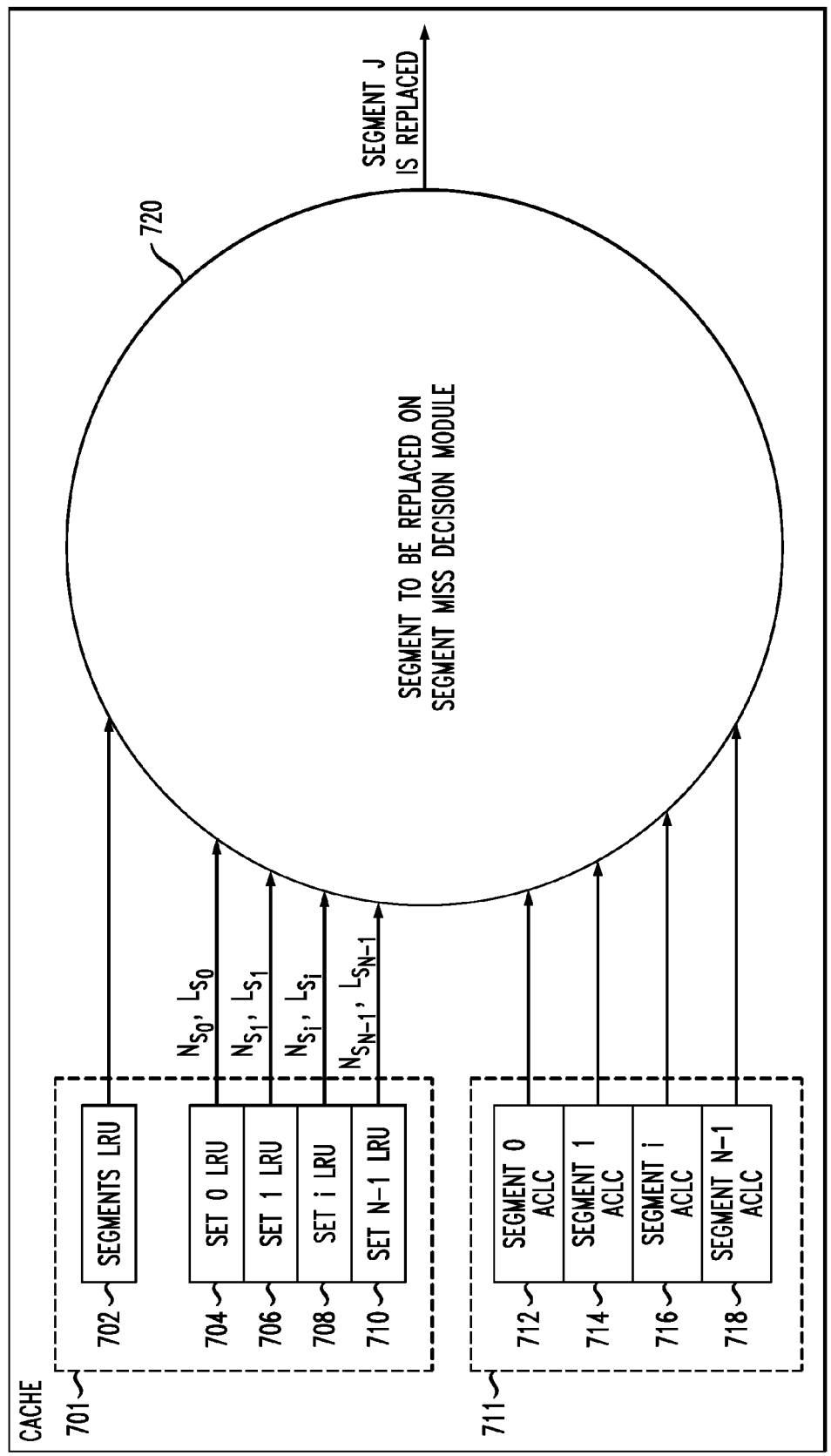
FIG. 7 is a block diagram depicting at least a portion of an exemplary memory cache, according to an embodiment of the present invention.

FIG. 7 is a block diagram depicting at least a portion of an exemplary memory cache 700, according to an embodiment of the invention. Cache 700 preferably includes an LRU information module 701 and an ACLC information module 711. LRU information module 701 is preferably operative to track how recently a given cache line and/or set of cache lines in the cache are used. ACLC information module 711, on the other hand, is operative to track how many active cache lines are associated with a given memory segment in the cache. It is to be understood that the term "module" as used herein is intended to broadly refer to at least one software component, at least one hardware component, or a combination of hardware and software components operative to perform a prescribed function or functions, as will be known by those skilled in the art. LRU information from the LRU information module 701 and ACLC information from the ACLC information module 711 is preferably supplied to a decision module 720 in cache 700. Decision module 720, which may be implemented in, for example, cache replacement controller 514 shown in FIG. 5, is preferably operative to make a determination as to which cache line to replace based at least in part on the LRU and ACLC information generated by the LRU information module 701 and ACLC information module 711, respectively.

More particularly, LRU information module 701 preferably comprises a segments LRU block 702 providing LRU information corresponding to one or more memory segments in cache 700. LRU information module 701 further comprises a plurality of set LRU blocks, including set 0 LRU block 704, set 1 LRU block 706, set i LRU block 708 and set N−1 LRU block 710, where N is an integer indicative of a number of cache sets in cache 700 and i is an integer indicative of a given cache set, 0≤i≤N, in a set associative cache context. Each of the set LRU blocks 704, 706, 708 and 710 provide LRU information regarding a corresponding cache set (not explicitly shown) in cache 700. ACLC information module 711 preferably includes one or more ACLCs, namely, segment 0 ACLC 712, segment 1 ACLC 714, segment i ACLC 716 and segment N ACLC 718, each of the ACLCs providing information regarding the number of active cache lines associated with a corresponding memory segment in cache 700.

Each cache set in cache 700 is preferably adapted to return information regarding the number of cache lines (Nsi) belonging to each corresponding segment and an LRU state of the cache lines in those segments (Lsi) in the corresponding cache set. Decision module 720 is operative to receive LRU information from LRU blocks 702, 704, 706, 708 and 710 and active cache line information from ACLCs 712, 714, 716 and 718. Decision module 720 is operative to implement a cache segment replacement policy for which of at least one of the segments should be replaced in the event of a cache miss or prefetch as a function of at least the received ACLC and LRU information.

By way of illustration only and without limitation, assume for simplicity an example scenario in which there are three segments (segment 0, segment 1 and segment 2) and one-way set associative caching (i.e., direct mapping) is used. Furthermore, assume that the 16 MSBs of the requested main memory address (access address) are used to identify a given one of the segments; address bits following the 16 MSBs indicate at least a portion of a requested memory address. For simplicity, it is also assumed that a cache segment replacement policy only uses ACLC information in determining which segment should be replaced.

With reference to now FIG. 8, table 2 indicates respective states of ACLCs and LRU registers during illustrative memory accesses. The ACLCs and LRU registers may be implemented, for example, as counters, although alternative means for tracking how many active cache lines are associated with a given segment (in the case of the ACLCs) and/or how often a segment is used (in the case of the LRU registers) are contemplated by the invention. More particularly, in row 802 of table 2, a reset is initiated. During a reset, all ACLCs and LRU registers for segments 0 through 3 are preferably initialized to a prescribed value; zero in this example. In row 804, segment 0 is accessed. Accordingly, the ACLC corresponding to segment 0 (ACLC 0) is incremented by one (e.g., to "1"), indicative of segment 0 containing one active cache line, and the LRU register corresponding to segment 0 (LRU 0) is set to a prescribed maximum count value; "2" in this example. In this embodiment, the LRU register for a given segment is preferably a counter which is set to a prescribed count value (e.g., "2") and is then decremented by one for each successive memory request that the given segment is not accessed until the counter reaches a prescribed minimum value (e.g., zero). Alternative tracking schemes are similarly contemplated (e.g., countdown counter). In row 804, ACLCs and LRU registers corresponding to the other segments (i.e., segments 1 and 2, ACLC 1, ACLC 2, LRU 1 and LRU 2, respectively) remain unchanged at zero. In row 806, segment 0 is again accessed. The ACLC corresponding to segment 0 is therefore incremented by one (e.g., to "2"), indicative of segment 0 containing two active cache lines, and the LRU register corresponding to segment 0 is again set to its maximum prescribed value (e.g., "2").

In row 808, segment 1 is accessed. The ACLC corresponding to segment 1 (ACLC 1) is therefore incremented by one (e.g., to "1"), indicative of segment 1 containing one active cache line, and the LRU register corresponding to segment 1 (LRU 1) is set to its maximum prescribed value (e.g., "2"). The ACLCs corresponding to segments 0 and 2 remain at their previous values (e.g., "2" and "0," respectively). The LRU register for segment 0 is decremented by one (e.g., to "1") since segment 0 was not accessed during the current memory request, and the LRU register corresponding to segment 2 (LRU 2) remains at zero (if, however, the state of LRU 2 was non-zero, LRU 2 would be decremented by one like LRU 1).

In row 810, segment 2 is accessed. The ACLC corresponding to segment 2 (ACLC 2) is therefore incremented by one (e.g., to "1"), indicative of segment 2 containing one active cache line, and the LRU register corresponding to segment 2 is set to its maximum prescribed value (e.g., "2"). The ACLCs corresponding to segments 0 and 1 remain at their previous values (e.g., "2" and "1," respectively). The LRU register for segment 0 is again decremented by one (e.g., to "0") and the LRU register corresponding to segment 1 is decremented by one (e.g., to "1") since segments 0 and 1 were not accessed during the current memory request.

In row 812, segment 2 is again accessed replacing a line from segment 1. The ACLC corresponding to segment 2 is therefore incremented by one (e.g., to "2"), indicative of segment 2 containing two active cache lines, and the LRU register corresponding to segment 2 is again set to its maximum prescribed value (e.g., "2"). The ACLC corresponding to segment 0 remains at its previous value (e.g., "2"). The LRU register for segment 0 remains at its minimum value (e.g., to "0"). Since a line from segment 1 has been replaced, the ACLC corresponding to segment 1 is decremented by one (e.g., to "0") and the LRU register corresponding to segment 1 remains at its previous value (e.g., "1").

In row 814, access to a new segment is requested which does not match the segment addresses in the segment register (i.e., a segment miss occurs). In this instance, the LRU cache replacement policy compares the ACLC states for segments 0, 1 and 2 to determine which segment has the greatest number of active cache lines associated therewith. Since, in this example, segment 0 has a greater number of active cache lines compared to segment 1 (i.e., ACLC 0>ACLC 1), segment 1 is replaced by the new segment (with address 4000). The ACLCs corresponding to segments 0 and 2 will remain at their previous values and the ACLC corresponding to segment 1 is incremented by one (e.g., to "1"), indicating that new segment 1 contains one active cache line. The LRU register corresponding to segment 0 remains at its prescribed minimum value (e.g., "0"), and LRU 2 is decremented by one (e.g., to "1") since segment 2 was not accessed during the current memory request. The LRU register corresponding to segment 1 is set to its prescribed maximum value (e.g., "2") since this segment was most recently accessed. As apparent from the above illustrative scenario, segment 1 is replaced with the new segment since the number of active cache lines in segment 0 is higher compared to segment 1.

Figure 9:
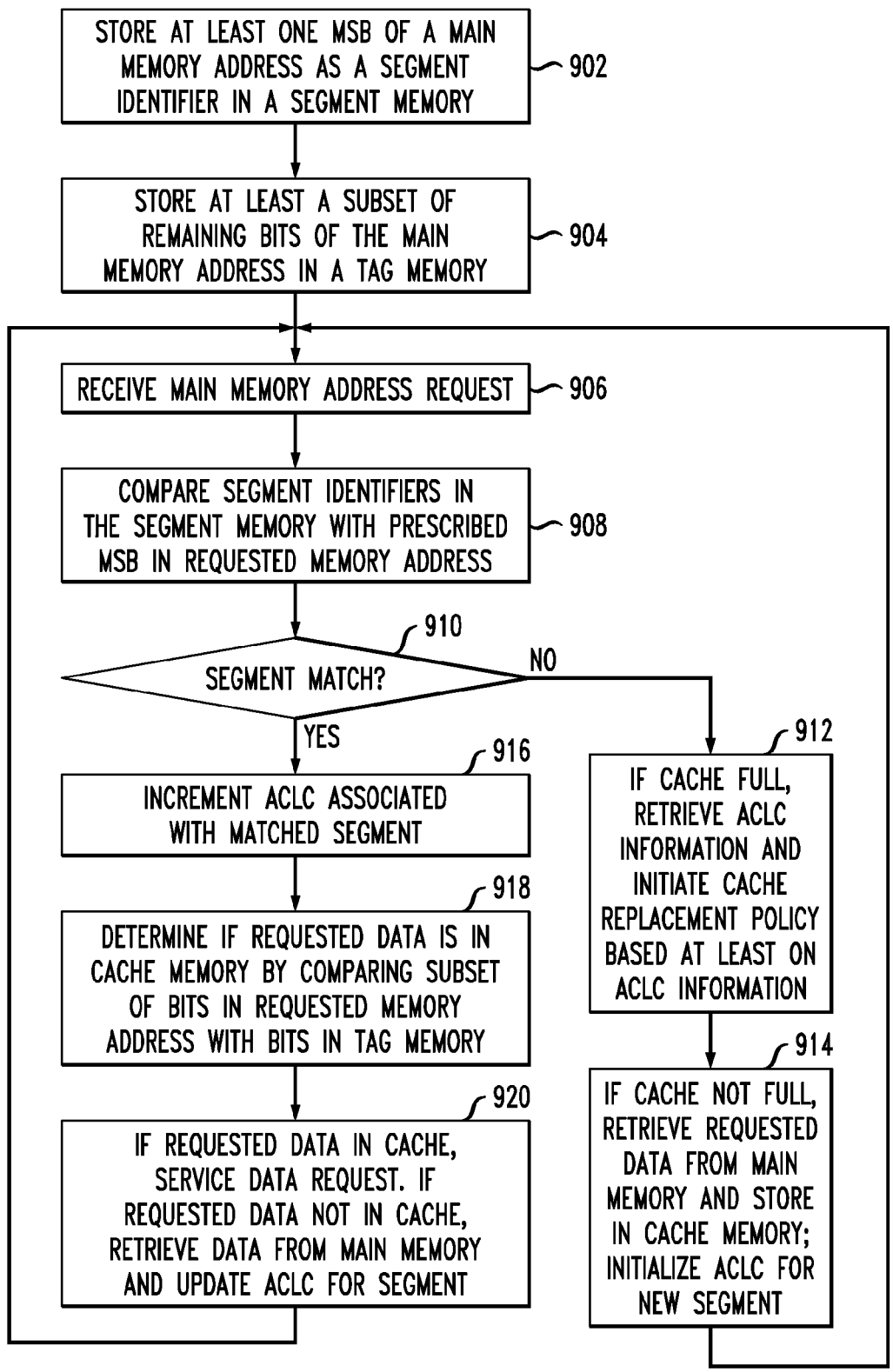
FIG. 9 is a flow diagram depicting an exemplary method for performing caching in a segmented memory architecture, according to an embodiment of the present invention.

FIG. 9 is a flow diagram depicting an exemplary method 900 for performing caching in a segmented memory architecture, according to an embodiment of the invention. In step 902, at least one MSB of a main memory address serviced by the cache is stored as a segment identifier in a segment memory (e.g., segment memory 506 in FIG. 5). Concurrently, at least a subset of the remaining bits of the main memory address is stored in a tag memory (e.g., tag memory 504 in FIG. 5) in step 904.

Upon receipt of requested main memory address in step 906, segment identifiers in the segment memory are compared with the prescribed at least one MSB in the requested memory address in step 908. Based on the result of the comparison in step 908, step 910 determines whether a segment miss (i.e., no match) or a potential segment hit (i.e., match) has occurred. If there is no segment match found (i.e., a "NO" result from step 910), method 900 continues to step 912 and determines whether or not the cache is full. If the cache is full, step 912 retrieves ACLC information pertaining to the segments and initiates a cache replacement policy based at least in part on the retrieved ACLC information. At this point, a cache segment selected by the cache replacement policy is replaced with the new memory segment. If the cache is not full, the requested data is simply retrieved from main memory in step 914 and stored in a corresponding cache memory location. The ACLC associated with the replaced segment is reassigned to the new segment and initialized. Method 900 then continues to step 906 to await receipt of a new main memory address request.

If a match between at least one segment identifier and the at least one MSB of the requested memory address is found in step 910, method 900 continues to step 916 where the ACLC associated with the matched segment is incremented to thereby track the number of active cache lines contained in that segment. Next, step 918 determines whether or not the data associated with the requested main memory address is located in the cache memory. To accomplish this, the subset of bits in the requested memory address is preferably compared to corresponding bits in the tag memory. If the requested data resides in the cache memory, the data request is serviced in step 920, such as by reading from the cache at the specified address. Conversely, if the requested data does not reside in the cache memory, the data is preferably retrieved from main memory and stored in the corresponding segment. In this instance, an update is made to the ACLC associated with that segment. Method 900 then continues to step 906 to await receipt of a new main memory address request.

Figure 10:
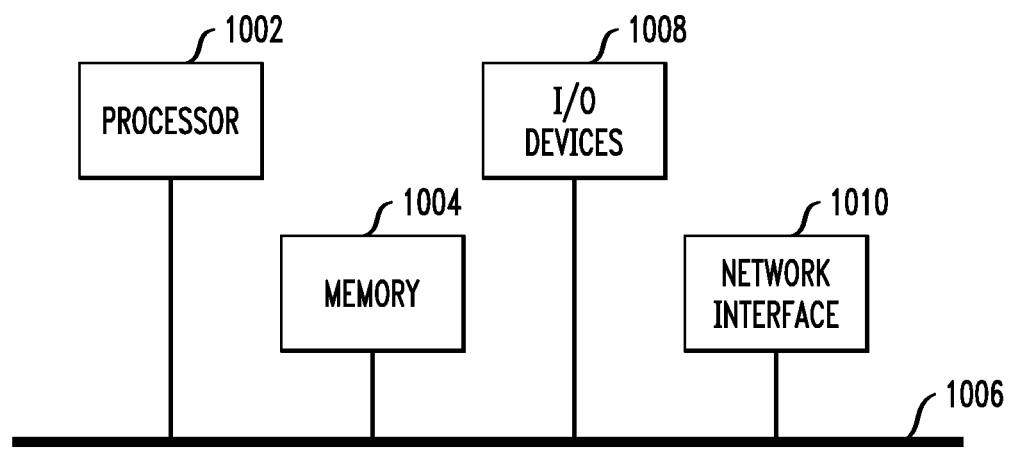
FIG. 10 is a block diagram depicting an exemplary system in which aspects of the present invention can be implemented, according to an embodiment of the invention.

Methodologies according to embodiments of the present invention may be particularly well-suited for implementation in an electronic device or alternative system, such as, for example, a microprocessor or other processing device/system. By way of illustration only, FIG. 10 is a block diagram depicting an exemplary data processing system 1000, formed in accordance with an aspect of the invention. System 1000 may represent, for example, a general purpose computer or other computing device or systems of computing devices. System 1000 may include a processor 1002, memory 1004 coupled with the processor, as well as input/output (I/O) circuitry 1008 operative to interface with the processor. The processor 1002, memory 1004, and I/O circuitry 1008 can be interconnected, for example, via a bus 1006, or alternative connection means, as part of data processing system 1000. Suitable interconnections, for example via the bus, can also be provided to a network interface 1010, such as a network interface card (NIC), which can be provided to interface with a computer or Internet Protocol (IP) network, and to a media interface, such as a diskette or CD-ROM drive, which can be provided to interface with media. The processor 1002 may be configured to perform at least a portion of the methodologies of the present invention, an illustrative embodiment of which has been described above.

It is to be appreciated that the term "processor" as used herein is intended to include any processing device, such as, for example, one that includes one or more processor cores, a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, one or more output devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1002. In any case, it is to be appreciated that at least a portion of the components shown in any of FIGS. 1 through 4 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in one or more integrated circuits. In forming integrated circuits, die are typically fabricated in a repeated pattern on a surface of a semiconductor wafer. Each of the die includes a memory described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with embodiments of the present invention can be employed in any application and/or electronic system which is adapted for performing multiple-operand logical calculations in a single instruction. Suitable systems for implementing embodiments of the invention may include, but are not limited to, personal computers, portable computing devices (e.g., personal digital assistants (PDAs)), multimedia processing devices, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An apparatus for performing data caching, comprising:
at least one cache memory including a plurality of cache lines arranged into a plurality of segments, each segment having a subset of the cache lines associated therewith;
a first plurality of counters, each of the first plurality of counters being operative to track a number of active cache lines associated with a corresponding one of the segments; and
at least one controller operative to receive information relating to the number of active cache lines associated with the corresponding one of the segments from the first plurality of counters and to implement a cache segment replacement policy for determining which of the plurality of segments to replace as a function of at least the information relating to the number of active cache lines associated with the corresponding one of the segments.

2. The apparatus of claim 1, further comprising a second plurality of counters, each of the second plurality of counters being operative to track time information relating to when the corresponding segment was accessed, the cache segment replacement policy being operative to determine which of the plurality of segments to replace as a function of at least the information relating to the number of active cache lines associated with the corresponding segment and the time information relating to when the corresponding segment was accessed.

3. The apparatus of claim 2, wherein the time information relating to when a corresponding segment was accessed comprises least recently used (LRU) information.

4. The apparatus of claim 1, further comprising a comparator circuit operative: to receive respective outputs from the plurality of segments; to receive a subset of a requested memory address supplied to the apparatus; and to generate corresponding output signals, each of the output signals being indicative of whether or not the subset of the requested memory address matches the corresponding one of the plurality of segments, the output signals being supplied to the first plurality of counters for tracking the number of active cache lines associated with the respective segments.

5. The apparatus of claim 4, wherein the subset of the requested memory address comprises N most significant bits of the requested memory address, where N is an integer representative of a number of bits in a segment identifier associated with each of the segments.

6. The apparatus of claim 5, further comprising a functional OR gate operative to receive the output signals generated by the comparator circuit and to generate a segment match signal indicative of match between the subset of the requested memory address and any of the segment identifiers associated with the segments.

7. The apparatus of claim 4, wherein for each output signal indicative of a match between the requested memory address and a given one of the segments, the corresponding one of the first plurality of counters is updated to indicate an additional active cache line associated with the given one of the segments.

8. The apparatus of claim 7, wherein a count value of the corresponding one of the first plurality of counters is incremented upon receipt of an active output signal associated with the given one of the segments.

9. The apparatus of claim 4, further comprising:
a tag memory operative to receive at least a subset of the requested memory address and to generate a segment pointer for associating each memory tag in the tag memory with the corresponding one of the plurality of segments in the at least one cache memory; and
a multiplexer operative to receive the output signals from the comparator circuit and the segment pointer from the tag memory and to generate a first signal indicative of whether or not a segment match is present in a given one of the segments corresponding to the segment pointer.

10. The apparatus of claim 9, further comprising a functional AND gate operative to receive the first signal generated by the multiplexer and a second signal generated by the tag memory, the second signal being indicative of whether or not a tag hit has occurred in connection with the requested memory address, the functional AND gate generating a third signal indicative of whether or not a segment hit has occurred.

11. The apparatus of claim 1, wherein each of at least a subset of the first plurality of counters is initialized to a prescribed count value upon receipt of at least one of a cache reset signal or an invalidate signal.

12. The apparatus of claim 1, wherein upon replacement of a given segment in the at least one cache memory with a new segment, a corresponding one of the first plurality of counters associated with the new segment is initialized to a prescribed count value.

13. The apparatus of claim 1, wherein at least a portion of the apparatus is implemented in at least one integrated circuit.

14. A method for performing data caching, the method comprising the steps of:
receiving a main memory address for accessing requested data in a corresponding location in main memory, the main memory being organized into a plurality of segments, at least a portion of the memory address including a segment identifier referencing one of the plurality of segments;
comparing segment identifiers corresponding to the plurality of segments in a segment memory with the segment identifier in the received main memory address for determining whether there is a segment match;
for each of at least a subset of the plurality of segments, tracking a number of active cache lines in a cache memory associated with a corresponding one of the segments; and
when a segment match has not occurred and the cache memory is full, implementing a cache segment replacement policy based at least on information relating to the number of active cache lines associated with the corresponding one of the segments.

15. The method of claim 14, wherein the step of tracking the number of active cache lines comprises:
providing a plurality of counters, each of the counters associated with a corresponding one of the plurality of segments in the segment memory;
incrementing a given one of the plurality of counters when the segment identifier associated with the corresponding one of the segments matches the segment identifier in the received main memory address;

decrementing the given one of the plurality of counters when a previously accessed cache line in the corresponding one of the segments is replaced; and when a given one of the plurality of segments is replaced with a new segment, initializing the corresponding one of the plurality of counters associated with the new segment to a prescribed count value.

16. The method of claim 14, wherein the step of implementing the cache segment replacement policy comprises:

tracking time information relating to when each of the plurality of segments was accessed; and implementing the cache segment replacement policy as a function of the time information relating to when the corresponding one of the plurality of segments was accessed.

17. The method of claim 16, wherein the time information relating to when each of the plurality of segments was accessed comprises least recent used (LRU) information.

18. The method of claim 14, further comprising when a segment match has not occurred and the cache memory is not full:

retrieving the requested data from the main memory;

storing the requested data in the cache memory; and initializing a counter to a prescribed count value, the counter being associated with the corresponding one of the segments and operating to track the number of active cache lines in the corresponding one of the segments.

19. The method of claim 14, further comprising when a segment match has occurred:

determining whether the requested data corresponding to the main memory address is in the cache memory;

when the requested data is in the cache memory, servicing the data request from the corresponding cache line in the cache memory; and when the requested data is not in the cache memory, retrieving data from the main memory, storing the requested data in the cache memory, and updating the information relating to the number of active cache lines associated with the corresponding one of the segments.

20. An electronic system, comprising:

at least one apparatus for performing data caching, the at least one apparatus comprising:

at least one cache memory including a plurality of cache lines arranged into a plurality of segments, each segment having a subset of the cache lines associated therewith;

a first plurality of counters, each of the first plurality of counters being operative to track a number of active cache lines associated with a corresponding one of the segments; and at least one controller operative to receive information relating to the number of active cache lines associated with the corresponding one of the segments from the first plurality of counters and to implement a cache segment replacement policy for determining which of the plurality of segments to replace as a function of at least the information relating to the number of active cache lines associated with the corresponding one of the segments.

21. An apparatus for performing data caching, comprising:

at least a first memory organized into a plurality of segments, at least a portion of the memory address including a segment identifier referencing one of the plurality of segments;

at least a second memory including a subset of the plurality of segments included in the first memory; and at least one processor coupled with the first memory and the second memory, the at least one processor being operative: (i) to receive a main memory address for accessing requested data in a corresponding location in the first memory; (ii) to compare segment identifiers corresponding to a plurality of segments in the second memory with the segment identifier in the received main memory address for determining whether there is a segment match; (iii) for each of at least a subset of the plurality of segments, to track a number of active cache lines in a cache memory associated with a corresponding one of the segments; and (iv) when a segment match has not occurred and the cache memory is full, to implement a cache segment replacement policy based at least on information relating to the number of active cache lines associated with the corresponding one of the segments.

* * * * *